United States Patent
Allen et al.

(10) Patent No.: US 6,279,500 B1
(45) Date of Patent: Aug. 28, 2001

(54) AIRCRAFT CARRIERS AND METHODS OF OPERATION THEREOF

(75) Inventors: Philip JP Allen; George R Seyfang, both of Preston (GB)

(73) Assignee: British Aerospace Public Limited Company, Farnborough (GB)

( * ) Notice: Subject to any disclaimer, the term of this patent is extended or adjusted under 35 U.S.C. 154(b) by 0 days.

(21) Appl. No.: 09/458,952

(22) Filed: Dec. 10, 1999

Related U.S. Application Data

(63) Continuation of application No. PCT/GB99/03655, filed on Nov. 5, 1999.

(30) Foreign Application Priority Data

Nov. 5, 1998 (GB) .................................................. 9824220

(51) Int. Cl.⁷ .................................................. B63B 35/50
(52) U.S. Cl. .................. 114/261; 114/259; 114/272; 244/114 R
(58) Field of Search .................................. 114/261, 259, 114/272; 244/105, 114 B, 114 R

(56) References Cited

U.S. PATENT DOCUMENTS

| | | | |
|---|---|---|---|
| 1,709,058 | * | 4/1929 | Brunner .............................. 114/261 |
| 3,196,822 | * | 7/1965 | Bertin et al. ...................... 114/261 |
| 3,362,368 | * | 1/1968 | Ringleb .............................. 114/261 |
| 4,700,912 | * | 10/1987 | Corbett .................................. 244/63 |
| 5,127,609 | * | 7/1992 | Lynn ............................... 244/114 B |
| 5,429,324 | * | 7/1995 | Lynn ............................... 244/114 B |

FOREIGN PATENT DOCUMENTS

| | | |
|---|---|---|
| 0 579 508 A1 | 1/1994 | (EP) . |
| 2677326 | * 12/1992 | (FR) . |
| 343763 | 2/1931 | (GB) . |
| 542907 | 2/1942 | (GB) . |
| 1036015 | 7/1966 | (GB) . |
| 1052359 | 12/1966 | (GB) . |

* cited by examiner

*Primary Examiner*—S. Joseph Morano
*Assistant Examiner*—Lars A. Olson
(74) *Attorney, Agent, or Firm*—Pillsbury Winthrop LLP

(57) ABSTRACT

An aircraft carrier is provided with an airflow deflector such as flap 26, an inflatable flap 26 or an airjet curtain such that air passing along the flight deck is provided with an upward component of velocity, thereby to provide an upwash in the airwake behind the aircraft carrier. The upwash persists for a reasonable length downstream of the aircraft carrier and means that, for a given spatial attitude, the angle of attack of the aircraft relative to the airstream is increased. This means that the aircraft may be flown at a reasonably high angle of attack to the airstream on a landing approach without sacrificing the pilot's view of the deck. In addition, the increased angle of attack may be used to facilitate a flare maneuver.

18 Claims, 4 Drawing Sheets

NO DEVICE (DATUM)

2m FLAP
FULL SPAN e 90m
△ UPWASH
+8°

2m FLAP
TAPERED

+5°

2m FLAP
CENTRAL GAP

+3°

VIRTUAL FLAP
(AIR JET CURTAIN)

+8°

AIRCRAFT CARRIERS AND METHODS OF OPERATION THEREOF

This is a continuation of: International Appln. No. PCT/GB99/03655 filed Nov. 5, 1998.

This invention relates to aircraft carriers and associated devices and methods of operation thereof to assist or enhance landing of aircraft on an aircraft carrier.

Recent studies of the possible use of modern fighter aircraft such as the Eurofighter in a naval role have suggested that the landing speed of the aircraft might be determined by the pilot-view-limited angle of attack (that is the angle of attack of the aircraft should be low enough for the pilot to have an adequate view of the flight deck when landing) rather than a defined stall margin. This is because aircraft such as the Eurofighter have a relatively low lift slope and the stalling angle is relatively high. Accordingly, in one aspect, this invention is concerned with providing a solution to the problem of allowing the pilot to land the aircraft at an angle of attack which gives him sufficient view of the flight deck and any surrounding visual cues from the cockpit whilst maintaining or reducing the touch-down vertical and horizontal velocities to acceptable levels.

With this in mind, we have analysed the airflow downstream of a ship (the airwake) in a conventional aircraft carrier and designed a modified form of aircraft carrier to provide a positive or increased upwash angle of the airwake behind the ship, so that the flight attitude of the aircraft may be lowered and hence the pilot view enhanced whilst maintaining an effective angle of attack greater than the flight attitude. Our initial studies suggest that the provision of an increased upwash angle should reduce the landing speed and provide some enhanced ground effect and hence a more gentle landing.

The natural airwake of a ship due its forward speed and natural wind has a small downwash component (burble) in the flow immediately behind the stern. This results because of the natural filling of the base region of separated airflow behind the ship from all possible areas, namely from the two sides and from above (i.e. the flight deck). Accordingly, in the embodiments described below, the flow from the flight deck is deflected upwards so that the base region of separated airflow behind the ship is filled only from the sides. The flow directed at an upwardly inclined angle from the end of the flight deck may then continue to flow at an upwardly inclined angle and provide an incremental upwash effect which persists for some distance behind the ship.

British Patent Specification No. 1,052,359 discloses a water-borne take off and landing craft which is intended to be propelled by jet engines through the water at a speed equivalent to the landing speed of an aircraft intending to land on the craft. The engines are disposed at the rear of the ship and spaced to either side of the approach path of the aircraft, and are directed horizontally. There is no suggestion of providing an increased upwash in the approach path of the craft to allow the usual flight attitude of the aircraft to be lowered.

British Patent Specification No. 1,036,015 discloses an arrangement for clearing sea mist or fog from the approach path behind an aircraft carrier. Hot efflux is discharged from the front of the craft from a turbojet or the like to lay a trail of hot air along a glide path behind the craft, to clear sea mist or fog. There is no suggestion in this document of an arrangement in which a flow deflection means is disposed in the aft end region of the flight deck to provide an increased upwash, nor of an arrangement in which the increased upwash is used to allow the usual flight attitude of the aircraft to be lowered.

British Patent Specification No. 542,901 discloses an arrangement designed to obstruct a landing strip, which projects upwardly. There is no suggestion of the use of such a device to provide an increased upwash behind an aircraft carrier.

British Patent Specification No. 343,763 discloses an arrangement in which an artificial antagonistic wind is generated by means of a blower or generator disposed at the front of the aircraft, some distance off the deck. The blowers or generators emit their efflux generally rearwardly.

Accordingly, in one aspect, this invention provides an aircraft carrier including a flight deck on which aircraft may land, said flight deck having a forward end and an aft end, said aircraft carrier having disposed in the aft region of said flight deck airflow deflection means for imparting to airflow passing along said flight deck in the general direction from said forward end to said aft end an upwardly inclined component of velocity, to provide or increase an upwash in the airwake in the aircraft approach path behind the aircraft carrier.

The airflow deflection means may be disposed at a number of different positions but it is preferred for this to be disposed at an aft end region of the flight deck to increase the extent of the airwake over which the upwash effect is effective.

The airflow deflection means may take many forms and conveniently comprises a generally upwardly inclined deflection surface which is disposed generally transversely to the landing direction, and extending substantially continuously thereacross.

The airflow deflection means may comprise a deflection surface of substantially uniform height across at least a substantial transverse extent of the flight deck. Alternatively, the airflow deflection means may comprise a deflection surface with a central portion of substantially uniform height. In one arrangement, the airflow deflection means may comprise a central gap where the deflection surface has an effective zero height. Alternatively, the central portion may be higher than the two side portions which diminish in height towards the sides of the carrier.

Although the deflection surface might be a permanent fixture, for example a permanent curved or projecting surface, in one aspect the deflection surface may be moveable between a deployed operative position and a stowed inoperative position.

For safety, the deflection surface should withstand the wind force encountered in normal operating conditions but be adapted to move to a collapsed condition or yield or rupture on accidental impact therewith by an aircraft or a part thereof.

In one embodiment, the deflection surface means comprises a flap element.

In another embodiment, said airflow deflection means comprises airflow generating means for generating a generally upward flow of air. By "upwards" we mean lying at an angle of within ±45° to the vertical, although in many instances the flow of air may be generally vertical i.e. within ±10° to the vertical.

In this embodiment, the airflow generating means may typically comprise a source of pressurised air such as a blower or compressor, and a slot means through which in use said pressurised air exhausts, thereby to generate said upward flow.

In another aspect, this invention provides a method of operating an aircraft carrier which has a flight deck on which aircraft can land, said flight deck having a forward end and an aft end, which method comprises causing said aircraft carrier to travel in a direction to cause an airflow to pass over said flight deck with a substantial component generally in the direction from said forward end to said rearward end, and imparting to the flow over said flight deck a generally upwardly inclined component of velocity.

Whilst the invention has been described above, it extends to any inventive combination of the features set out above or in the following description.

The invention may be performed in various ways and, by way of example only, various embodiments thereof will now be described in detail, reference being made to the accompanying drawings in which.

Figure 5A:
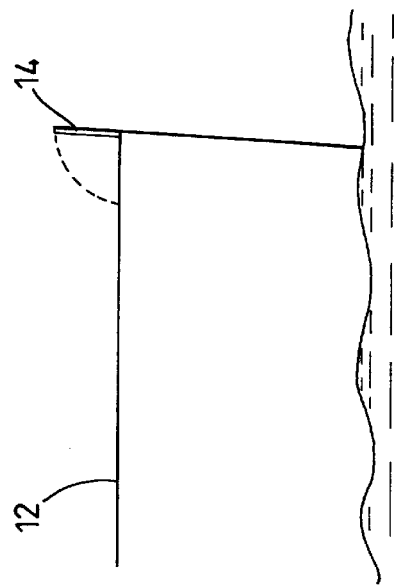

FIGS. 5(a), (b), (c), and (d) are schematic side views of the rear of an aircraft carrier in accordance with various embodiments of the invention, and FIG. 6 (a), (b), (c), (d) and (e) are schematic views on the rear of a ship with no deflection means, and with various configurations of a solid surface deflector and an aerodynamic deflector respectively, indicating the estimated amounts of upwash in each case.

As mentioned above, the angle of attack of an aircraft as it makes its final approach to the landing deck is strongly influenced in many instances by the need for the pilot to be able to have an adequate view of the landing deck from the cockpit. However, in conventional aircraft carriers, where the airwake is horizontal or downwardly inclined, the lower the angle of attack of the aircraft during the moments prior to touchdown, the higher the touchdown speeds. Thus, in the embodiments described below, the local airflow along the glide slope aft of the ship is given an upward component of velocity so that for a given nose up attitude of the aircraft on the landing approach, the actual angle of attack is increased and so the touchdown landing speed may be reduced. Also, with the increased effective angle of attack an enhanced ground effect may be achieved leading to a possible reduction in the touchdown vertical speed.

Figure 1:
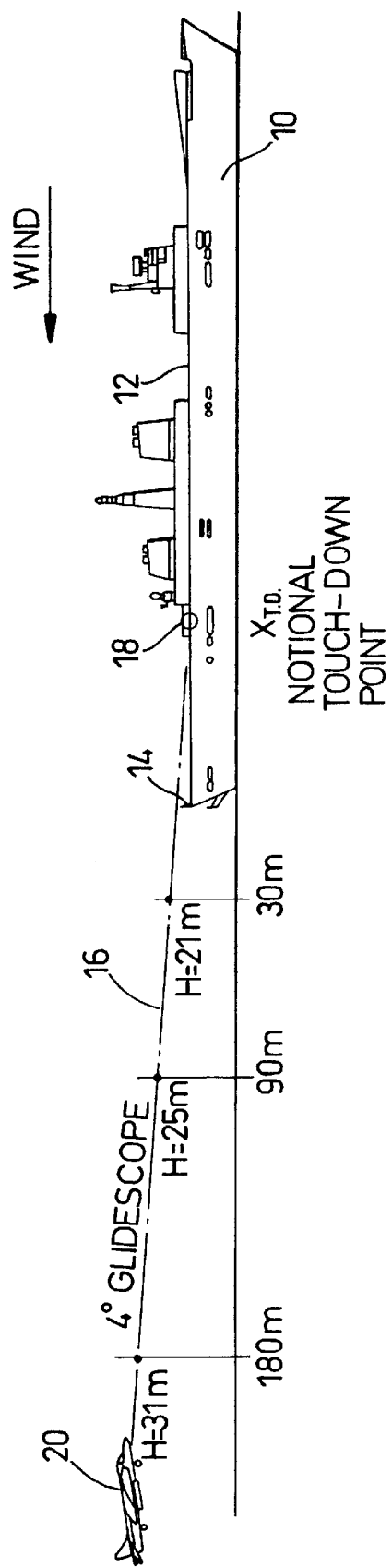
FIG. 1 is a side view of an embodiment of an aircraft carrier accordance with this invention.
Figure 2:
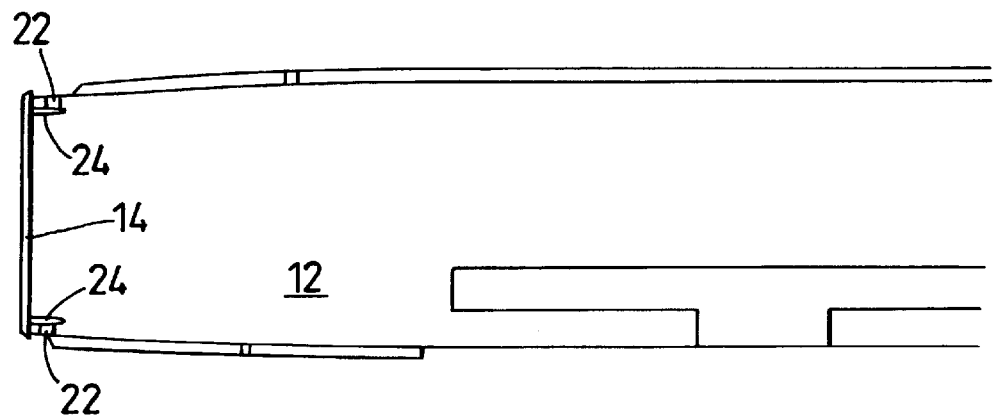
FIG. 2 is a top plan view, on an enlarged scale, of the rear part of the aircraft carrier of FIG. 1.

Referring now to FIG. 1 there is shown an aircraft carrier 10 which is headed into the wind with a typical wind-over-deck flow of about 30Kts. The aircraft carrier has a landing deck 12 running for substantially the whole length of the vessel. At the rear end of the flight deck 12 is provided a flap 14 which extends transversely across substantially the whole of the flight deck. In this embodiment the flap is directed at 90° to the flight deck but it could be at other upwardly directed angles such as 45° (leaning back). The flap is pivotally mounted on the deck for movement between the upstanding operative position, and a stowed position, as to be described with reference to FIGS. 2 to 4 below.

Also shown on FIG. 1 is a notional 4° glide slope 16 to a notional touchdown point 18 on the landing deck. An aircraft 20 is shown schematically making a landing approach to the ship, and the typical landing speed of the aircraft may be 150Kts or so. The flap 14 deflects the airflow passing over the flight deck so that it has an increased upwash in the approach region to the rear of the aircraft carrier. As to be described below, the flap may typically give an increased upwash angle of between 3° and 8° on the 4° glide slope at a distance of 90 meters to the rear of the ship.

Experiments have shown that increases in the flap height cause an increased upwash effect but even that a small flap has a noticeable effect, and further that the upwash effect is maintained for about 100 meters (half a ship length) but has almost disappeared by about 200 metres (full ship length) behind the aircraft carrier.

The upwash angles referred to above are the upwash of the wind-over-deck flow which might be about 30Kts or so. Given a typical aircraft approach speed of about 150Kts, an incremental upwash of, say, 10° is equivalent to 2° extra angle of attack for the aircraft. This 2° extra angle of attack could be used in two possible ways. One way would be to allow a reduced landing speed if the aircraft angle of attack is pilot-view limited. A typical speed reduction would be about 8Kts or so. Another way would be to cause a flare manoeuvre if the air speed and flight attitude are held constant. This might achieve a typical reduction of touchdown vertical velocity by about 1.5m/s or so.

Figure 3:
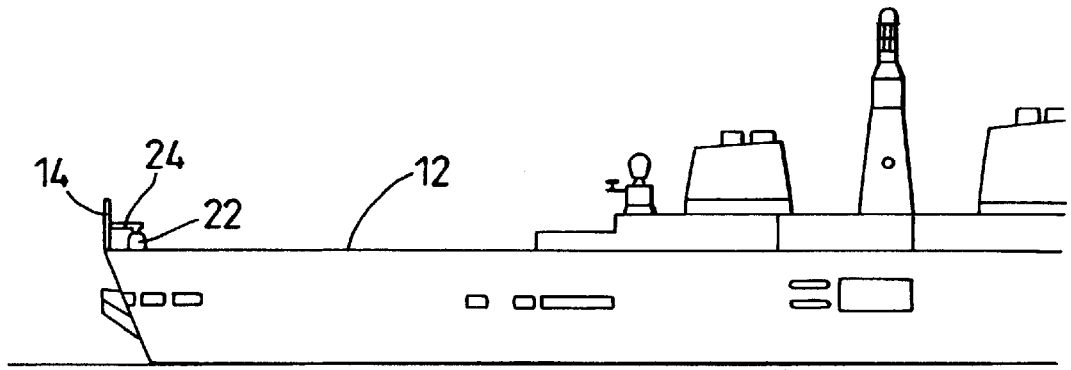
FIG. 3 is a side view, on an enlarged scale, of the rear part of the aircraft carrier of FIG. 1.
Figure 4:
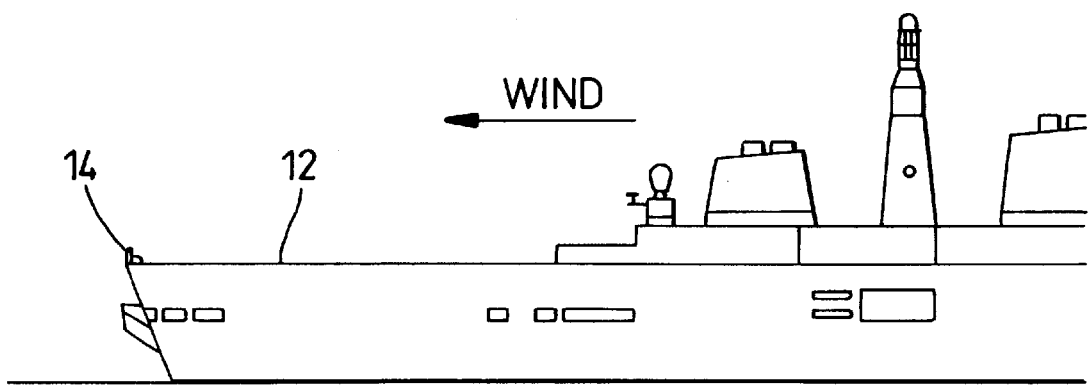
FIG. 4 is a side view, in an enlarged scale, of a second embodiment of aircraft carrier in accordance with this invention.

Referring to FIGS. 3 and 4, these show flap elements of different height in proportion to the rear part of the aircraft carrier, and the same reference numerals are used. The flap 14 may be deployed between the operative upwardly projecting position seen in the Figures and an inoperative stowed position (not shown) where it lies flat on the flight deck. Movement between the operative and inoperative positions is effected by means of an actuator 22 and stays 24.

FIGS. 5(a) to (d) illustrate various ways in which the increased upwash may be achieved. FIG. 5(a) illustrates the principles embodied in FIGS. 1 to 4 namely that of a vertical flap which causes the airflow to divert at an upward angle relative to the deck.

Figure 5B:
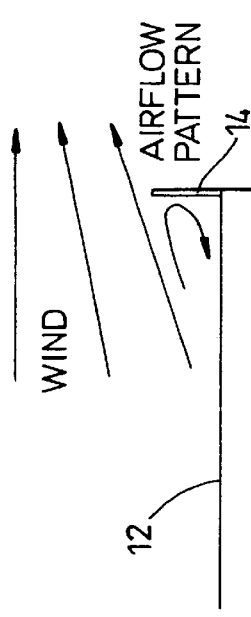

Referring to FIG. 5(b) the aerodynamic principles of this embodiment of flap element are similar to those of FIG. 5(a), but here the flap is arranged to be of frangible or knockdown construction to minimise damage to an aircraft due to inadvertent impact.

Figure 5C:
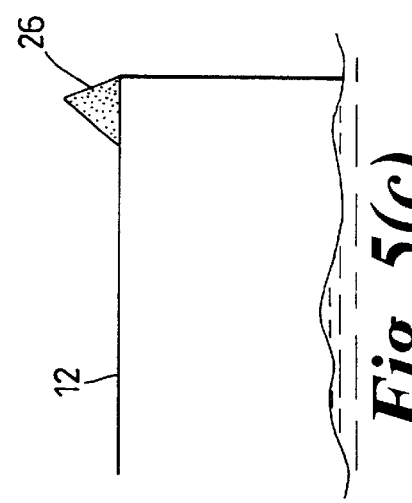

In FIG. 5(c) the flap element is here in the form of an inflatable flap element 26 which deflects the airflow upwardly from the flight deck 12.

Figure 5D:
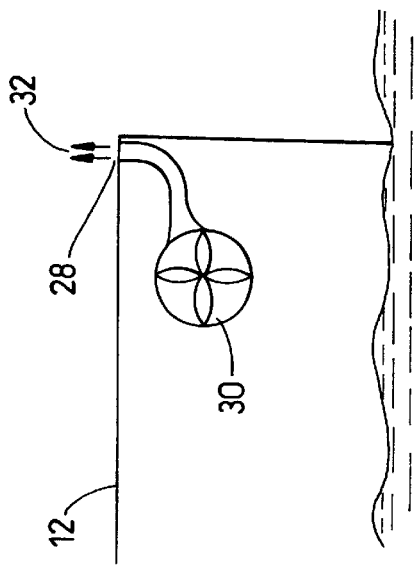

In FIG. 5(d) the flap element is replaced by a slot 28 which is supplied with pressurised air from a blower 30 or a compressor on board the aircraft carrier to provide an airjet curtain 32 which again diverts air passing over the flight deck 12 upwardly to provide an increased upwash.

Figure 6A:
Figure 6B:
Figure 6C:
Figure 6D:
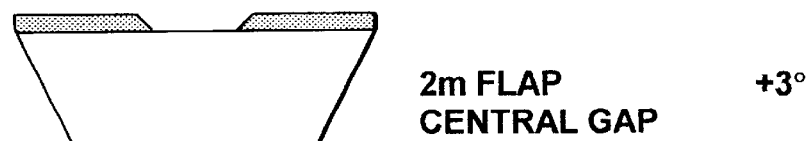
Figure 6E:

Referring now to FIG. 6, the flap designs of FIGS. 1 to 5(a) may be of uniform height (as shown in FIG. 6(b)) or of tapered or gapped form as shown in FIGS. 6(c) and (d). Given a maximum height of 2 meters, wind tunnel studies on a model suggest that a flap of uniform height will provide an increased upwash of 8° on the 4° glide slope 9° metres downstream of the ship, whereas the tapered and gapped forms will provide lesser increases in the upwash, Aircraft Carriers and Methods of Operation Thereof namely 5° and 3° respectively. Tests on a device incorporating the blower fan concept of FIG. 5(d) indicate that an increased upwash on the 4° glide slope at 9° meters downstream of the ship of around 8° is feasible.

What is claimed is:

1. A method of operating an aircraft carrier including a flight deck on which aircraft may land, said flight deck having a forward end and an aft end, the method comprising:

causing said aircraft carrier to travel in a direction to cause an airflow to pass over said flight deck generally in the direction from the forward end towards said aft end; and imparting to the airflow over said flight deck an upwardly inclined component of velocity to provide or increase an upwash in the airwake behind the aircraft carrier, wherein the upwash is imparted to the aircraft.

2. A method according to claim 1, wherein said upwash is caused by an airflow deflector disposed at an aft end region of said flight deck.

3. A method according to claim 1, wherein said upwash is caused by an upwardly inclined deflection surface disposed generally transversely to the direction of a take off direction or a landing direction of said flight deck.

4. A method according to claim 1, wherein said upwash is caused by a deflection surface of substantially uniform height across at least a substantial transverse extent of the flight deck.

5. A method according to claim 1, wherein said upwash is caused by a deflection surface with a central portion of substantially uniform height and side portions to either side of said central portion of diminishing height.

6. A method according to claim 1, wherein said upwash is caused by a deflection surface moveable between a deployed, operative position and a stowed inoperative position.

7. A method according to claim 1, wherein said upwash is caused by a deflection surface adapted to move to a collapsed state on impact by an aircraft or part thereof.

8. A method according to claim 1, wherein said upwash is caused by a deflection surface having a flap element.

9. A method according to claim 1, wherein said upwash is caused by an airflow deflector having an inflatable member, said inflatable member defining a deflection surface, and an inflator for inflating said inflatable member.

10. A method according to claim 1 wherein said upwash is caused by discharging a generally upward flow of air from an airflow generator.

11. A method according to claim 10, wherein said upwash is generated by directing a source of pressurized air through a slot thereby to generate said upward flow.

12. The method according to claim 1, wherein the airflow is a non-artificial airflow generated by moving the aircraft carrier generally into a direction of ambient wind.

13. A method of operating an aircraft carrier in an aircraft landing mode to reduce the required attitude of an approaching aircraft relative to the horizontal for a given landing speed, said aircraft carrier having a flight deck on which an aircraft can land, said flight deck having a forward end and an aft end, the method comprising:

causing said aircraft carrier to travel in a direction to cause an airflow to pass over said flight deck generally in the direction from said forward end to said rearward end; and imparting to the flow over said flight deck an upwardly inclined component of velocity to provide or increase an upwash in the airwake behind the aircraft carrier, wherein the upwash is imparted to the aircraft.

14. The method according to claim 13, wherein the airflow is a non-artificial airflow generated by moving the aircraft carrier generally into a direction of ambient wind.

15. An aircraft carrier comprising:

a flight deck having a forward end and an aft end; and an airflow deflector disposed near the aft end of the flight deck, the airflow deflector creating an upwardly inclined component of velocity to airflow passing over the flight deck to provide or increase an upwash in the airwake behind the aircraft carrier, the airflow deflector including an inflatable member.

16. A method of landing on a flight deck of an aircraft carrier an aircraft of the type having a relatively low lift slope and a relatively high stalling angle, said method being adapted to reduce the required attitude of the aircraft for a given landing speed, said flight deck having a forward and a rearward end, said method comprising:

causing said aircraft carrier to travel in a direction to cause an airflow to pass over said flight deck generally in the direction from said forward end to said rearward end;

imparting to the airflow over said flight deck an upwardly inclined component of velocity to provide or increase an upwash behind the aircraft carrier; and causing the aircraft to approach the flight deck through said upwash.

17. The method according to claim 16, wherein the airflow is a non-artificial airflow generated by moving the aircraft carrier generally into a direction of ambient wind.

18. An aerodynamic landing aid for fitting to an aircraft carrier to provide or increase an upwash in the airwake behind the aircraft carrier, comprising an airflow deflector for being fitted to the aircraft carrier and operable in use to impart to airflow passing over the flight deck of said aircraft carrier an upwardly inclined component of velocity that is imparted to a landing aircraft, said airflow deflector being collapsible, to prevent or reduce damage to the landing aircraft on inadvertent impact therewith.

* * * * *